(12) United States Patent
Li et al.

(10) Patent No.: US 6,376,999 B1
(45) Date of Patent: Apr. 23, 2002

(54) ELECTRONIC BALLAST EMPLOYING A STARTUP TRANSIENT VOLTAGE SUPPRESSION CIRCUIT

(75) Inventors: Yushan Li, Ossining; Chin Chang, Yorktown Heights, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/663,807

(22) Filed: Sep. 15, 2000

(51) Int. Cl.[7] .............................................. H05B 37/02
(52) U.S. Cl. ....................... 315/307; 315/224; 315/324; 315/DIG. 5
(58) Field of Search ................................ 315/324, 307, 315/205, 224, DIG. 5

(56) References Cited

U.S. PATENT DOCUMENTS

| | | | |
|---|---|---|---|
| 3,754,160 A | * | 8/1973 | Jensen .......................... 315/97 |
| 4,513,226 A | | 4/1985 | Josephson |
| 4,523,128 A | | 6/1985 | Stamm et al. |
| 4,525,649 A | | 6/1985 | Knoll et al. |
| 5,117,161 A | | 5/1992 | Avrahami |
| 5,424,611 A | | 6/1995 | Moriarty, Jr. |
| 5,574,336 A | | 11/1996 | Konopka et al. |
| 5,680,017 A | | 10/1997 | Veldman et al. |
| 5,747,943 A | | 5/1998 | Houk et al. |
| 5,930,121 A | | 7/1999 | Henry |
| 6,011,360 A | | 1/2000 | Gradzki et al. |
| 6,084,361 A | | 7/2000 | Wacyk |

* cited by examiner

*Primary Examiner*—David Vu

(57) ABSTRACT

An LCD backlight inverter that comprises a power stage that includes a first power switch and a second power switch that powers one or more cold cathode fluorescent lamps. A controller generates control signals, receives an IC supply input signal having a voltage level equaling or exceeding a prescribed threshold level, and provides a steady-state internal oscillation that drives said first and second power switches. A transient prevention circuit maintains said second power switch in a nonconducting state until at least a time at which said IC supply input signal reaches said prescribed voltage threshold. Alternatively, a transient prevention circuit maintains said second power switch in a nonconducting state until at least a time at which said IC supply input signal reaches said prescribed voltage threshold, and additionally prevents the controller oscillator from generating said internally generated oscillation until at least a time at which a supply voltage to the IC reaches a threshold value.

18 Claims, 7 Drawing Sheets

US 6,376,999 B1

ELECTRONIC BALLAST EMPLOYING A STARTUP TRANSIENT VOLTAGE SUPPRESSION CIRCUIT

BACKGROUND OF THE INVENTION

1. Field of the Invention

The present invention relates generally to a fluorescent lamp ballast and, more particularly, to circuitry for providing transient prevention for use with a dimmable cold cathode fluorescent lamp (CCFL) ballast.

2. Description of the Related Art

Open circuit protection is often required in electronic ballasts for safety and reliability reasons. When the lamps, i.e., loads, are not connected to the ballast outputs, there will be a very large undesirable voltage occurring across the ballast outputs if protection is not in place. This unloaded case can result in an output voltage which may be on the order of 5× higher than a nominal output with the lamps connected (e.g., 3500 volts instead of 700 volts). The overvoltage condition can damage ballast components and/or cause the ballast running into an unexpected state, and thus eventually damaging the ballast.

Overvoltage protection is required in lamp driving circuits as described in U.S. Pat. Nos. 5,680,017, 6,011,360 and 6,084,361; the contents of each of which are hereby incorporated herein by reference.

FIG. 1 illustrates a block diagram of the liquid crystal display (LCD) backlight inverter in accordance with the prior art, designated generally by reference numeral 100. The LCD backlight inverter 100 typically comprises a power stage module 6 for operating a lamp(s), such as L1 8 and L2 10. Lamps 8 and 10 may be, but are not limited to illuminating a liquid crystal display (LCD) of a desktop computer (not shown). The LCD backlight Inverter 100 further comprises a startup logic module 16, a short/open protection module 15, and a control IC (integrated circuit) 20. It is noted that a pulse width modulating module may be incorporated in the configuration of FIG. 1 with minor modifications to control signals between the IC 20 and the power stage module 6.

IC 20 performs a number of functions including: regulating lamp power by sensing lamp current and voltage, receiving and outputting control and non-control signals, generating an internal oscillation for driving power switches (not shown) included as part of the power stage module.

FIG. 1 shows two control signals G1 and G2 which represent output control signals for driving half bridge switches internal to the power stage module 6, which regulates the output power of transformers internal to power stage module 6 to drive L1 and L2. The startup logic module 16 powers the IC 20 (See signal Chip_$V_{dd}$) under normal operating conditions and prevents IC 20 from receiving power under fault conditions or whenever an "enable" signal to the startup logic module 16 is not activated. At startup, signal Chip_$V_{dd}$ will ramp up to reach a threshold voltage, $V_{don}$. The IC 20 is said to be in an oscillation mode after the threshold voltage $V_{don}$ is reached. The startup logic module 16 is further used to disable IC 20 to prevent detected overvoltages from damaging IC 20, as described further below.

FIG. 2 is an illustration depicting particular elements of FIG. 1 and additionally provides a detailed circuit diagram of the power stage module 6 of FIG. 1. The power stage module 6 is based on a voltage-fed, half-bridge resonant converter for providing a high starting voltage (e.g., >1700 Vrms) to ignite the lamps and a current source drive to run the lamps in the on-state with high efficiency (i.e., >85%). As shown in FIG. 2, power stage module 6 comprises two power switches, M1 31 and M2 32. In the present embodiment, M1 31 is a high side power MOSFET switch and M2 32 is a low side power MOSFET switch. The power switches may also be embodied as insulated gate bipolar transistors (IGBTs) in alternate embodiments. The half bridge switches M1 and M2 are each driven in a steady state mode of operation, with non-overlapping gate signals, G1 and G2, respectively. As shown, the power switches are arranged in a half bridge topology, having a common point 33 for sourcing an L-L-C resonant circuit comprising inductor T3 37, transformers T1 36, T2 38, and capacitor C39 and C40. Lamp L1 8 is shown connected to a secondary winding of transformer T1 36 and lamp L2 10 is connected to a secondary winding of transformer T2 38 without ballasting capacitors. In the exemplary embodiment, lamps L1 8 and L2 10 are cold cathode fluorescent lamps (CCFL). It is well known to those in the art that other types of loads may be substituted for the lamps L1 8 and L2 10 in different applications. By not using ballasting capacitors, the reactive power handled by the output transformers is minimized. The two lamps L1 8, L2 10 share a common ground and a common lamp current sensing resistor RSENSE.

Power switch M2 32 is driven to conduct alternately by a control signal G2 46 provided by IC 20, and power switch M1 31 is driven to conduct alternately by a control signal G1 48 provided by IC 20. Lamp power regulation is provided by closed-loop feedback control. A Lamp voltage is obtained from a tightly coupled winding on the secondary of output transformers T1 36 and T2 38, while the lamp current is detected across resistor RSENSE tied in series with the lamp. The lamp current detected across RSENSE is provided as an input to pins LI1 and LI2 of IC 20 to represent the average current in the lamp. The IC 20 then drives the half bridge frequency in a direction to achieve the desired lamp power as dictated by a reference input to the controller. In this case, the reference input is the DIM input pin to the controller.

With continued reference to FIG. 2, the startup sequence of the liquid crystal display backlight inverter of the prior art will be described to illustrate the limitations of the prior art regarding the inability to protect against the occurrence of a startup overvoltage transient.

Initially, (i.e., during startup) power switches M1 31 and M2 32 are in a nonconducting state. Input signal Chip_$V_{dd}$ 43 is off as a consequence of ENABLE 42 being off. Inverter 100 input $V_{dd}$ 44 is applied to the circuit and consequently a node voltage VNODE 40 at a common point between C3 40 and C1 41 will be charged to $V_{dd}/2$ as a consequence of C3 40 and C1 41 having the same capacitance value. At the point in time when the ENABLE signal 42 is switched on, IC 20 supply Chip_$V_{dd}$ 43, which is sourced from supply voltage $V_{dd}$ 44, slowly charges from zero volts and is applied to the pin of IC 20 labeled $V_{dd}$. IC 20 supply Chip_$V_{dd}$ 43 slowly charges to reach a threshold voltage $V_{don}$. Prior to reaching the threshold level, $V_{don}$, in response, IC 20 will activate pin G2 to cause output signal G2 to maintain M2 32 in an ON state, and high side power switch M1 31 in an OFF state.

As previously stated, IC 20 does not oscillate prior to Chip_$V_{dd}$ reaching a threshold level $V_{don}$. Prior to IC supply Chip_$V_{dd}$ 43 reaching the threshold level $V_{don}$, M2 32 is maintained in an ON state thereby creating a path through T2, T1, T3 and M2, thereby allowing node VNODE 40 to discharge to zero. This creates a DC offset (asymmetry) in sensing inductor T3 37 which is converted to an unbalanced sensing signal along line 54. The voltage asymmetry is sensed by input inductor current sensing pin RIND of IC 20 which drives the half bridge frequency undesirably lower towards the resonant frequency. In particular, signals G2 and G1 begin to prematurely oscillate at an undesirable low frequency thus driving the low and high side power switches M2 32 and M1 31, respectively, at the undesirable low frequency rate. The low switching rate is undesirable in that it is near the resonant frequency of the L-L-C resonant circuit formed by resonant inductor T3, transformers T1 36, T2 38, and capacitors C39 and C40, thereby causing the startup voltage transient.

The undesirable low frequency rate at which power switches M1 31 and M2 32 are driven is a consequence of the controller being an on-time controller type as opposed to a frequency controller. On-time controllers are described in detail in U.S. Pat. No. 6,084,361. On-time controllers characteristically control the switching frequency by indirect means. Specifically, frequency control is performed in response to sensing an external inductor's zero crossings. By contrast, frequency controllers do not rely upon an external sensing signal to perform frequency control and are therefore less immune to overvoltage transients.

FIG. 3 is a waveform diagram illustrating the process described above. As shown, channel 1 represents IC supply Chip_$V_{dd}$ 43 which is sourced from voltage $V_{dd}$ 44. IC 20 maintains the M2 32 gate in an ON state prior to Chip_$V_{dd}$ 43 reaching a predetermined threshold voltage, $V_{don}$. It is this time 49 (i.e., the time prior to Chip_$V_{dd}$ reaching a threshold level $V_{don}$) associated with Chip_$V_{dd}$ that results in the M2 gate operating at an undesirable low frequency as illustrated by "A" (See channel 4). Channel 2 represents the VNODE 40 voltage shown initially discharged to zero volts due to the path to ground created through M2 32 during start-up, i.e., prior to $V_{don}$ being attained. Consequently, VNODE 40 increases from zero which creates the inductor current asymmetry in T3 37 as discussed above. Channel 3 illustrates the inductor current asymmetry sensed by the RIND input of IC 20 as a result (note the asymmetric spikes towards the left side of the waveform). Channel 4 illustrates the effect of the detected asymmetry. Specifically, switch M2 32, which is shown to be initially driven at an undesirably low switching rate or frequency, near the frequency of the L-L-C series resonant circuit causing an startup overvoltage transient (See interval A). It is noted that this transient persists for an extended time (e.g., 400 µs) because capacitors C1 41 and C3 40 are relatively large (e.g., 100 µf each) and therefore node VNODE 40 takes a relatively long transient time to stabilize at $V_{dd}/2$ (See Point B). During this time, the low switching rate of gate M2 32 persists until VNODE 40 re-stabilizes back to $V_{dd}/2$.

Another undesirable consequence of the prior art configuration is that due to the long transient, the inverter may not be able to startup.

SUMMARY OF THE INVENTION

Accordingly, it is desirable to provide a liquid crystal display backlight inverter which operates the lamp under more stable startup conditions. The overvoltage prevention circuitry should particularly address the relatively long transient time required for the inductor current waveform to become symmetric again.

The present invention provides an improved liquid crystal display (LCD) backlight inverter which overcomes the problems associated with the prior art. More particularly, the present invention provides a circuit for preventing a startup transient (i.e., overvoltage condition) in a LCD backlight inverter.

In a first embodiment according to the present disclosure, there is provided an improved LCD backlight inverter comprising: a power stage that includes a first power switch and a second power switch that powers one or more loads (e.g., lamps); a controller that generates control signals, that receives an IC supply equaling or exceeding a prescribed threshold level, and provides a steady-state internal oscillation that drives said first and second power switches; and a transient prevention circuit that maintains said second power switch in a nonconducting state until at least a time at which said IC supply reaches said prescribed voltage threshold.

In a second embodiment according to the present disclosure, there is provided an improved LCD backlight inverter comprising: a power stage that includes a first power switch and a second power switch that powers one or more loads (e.g., lamps); a controller that generates control signals, that receives an IC supply input signal having a voltage level corresponding to a voltage level of said voltage source, and that generates and outputs a signal corresponding to an internally generated oscillation that drives said first and second power switches; and an transient prevention circuit that prevents said oscillator from generating said internally generated oscillation until at least a time at which said IC supply input signal reaches a prescribed threshold value.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

In the figures, like reference numbers generally indicate identical, functionally similar, and/or structurally similar elements.

DETAILED DESCRIPTION OF THE PRESENT INVENTION

Preferred embodiments of the presently disclosed transient prevention circuit of the present disclosure will now be described in detail with reference to FIGS. 4–6, wherein like reference numbers identify similar or identical elements. While the embodiments disclosed herein are designed for a liquid crystal display (LCD) backlight inverter for controlling at least one LCD lamp (the load), the presently disclosed embodiments of the transient prevention system can be used in any application requiring transient prevention for operating a load.

1st Embodiment

Figure 4:
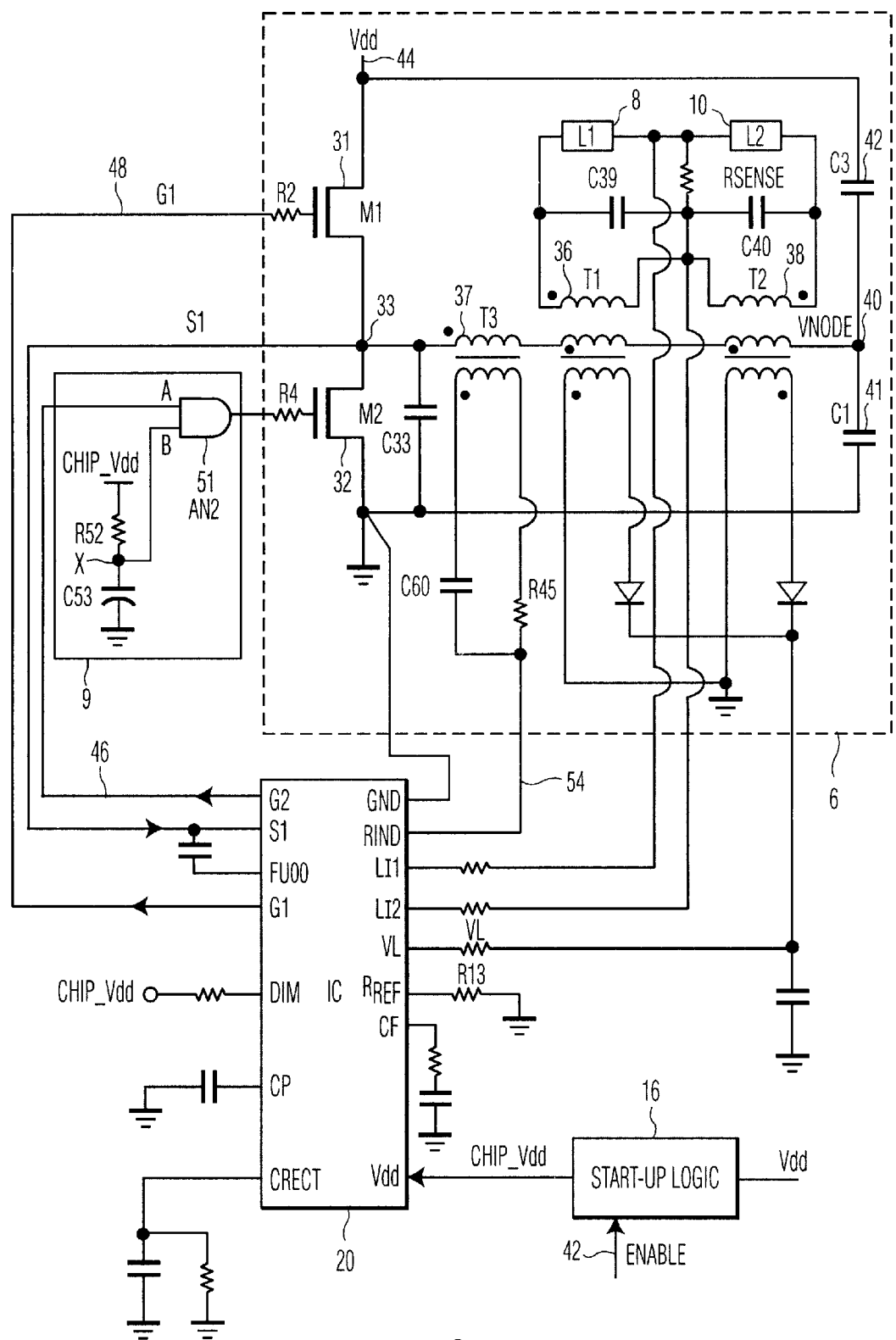
FIG. 4 is an electronic circuit diagram of a improved LCD backlighting inverter constructed in accordance with a first embodiment of the present invention.

FIG. 4 is a detailed circuit diagram of a first embodiment of the transient prevention circuit of the present invention generally shown as reference numeral 9. Circuit 9 of FIG. 4 comprises a two-input AND gate 51 with one input connected to a midpoint of a series RC circuit having an associated RC time constant. The RC circuit includes a resistor R52 and a capacitor C53. The resistor and capacitor values are determined by the time constant value (i.e., R52*C53) required for the particular application. Voltage Chip_$V_{dd}$ 43 is applied to resistor R52 during startup and during subsequent operation. It is noted that in an alternate embodiment the transient prevention circuit 9 of FIG. 4 may be included as part of a pulse width modulated dimming logic module, in the case where a pulse width modulated dimming logic module is employed.

The operation of the LCD backlight inverter according to the first embodiment is described as follows. Output pin G2 of IC 20 outputs a signal G2 46 which is provided as input to the transient prevention circuit 9 at input A of AND gate 51. Input B of AND gate is connected to the mid-point X of the R-C circuit. As noted, Chip_$V_{dd}$ 43 is applied at startup, thus the voltage at point X and input B increases according to the RC time constant. Thus, a high signal to input B of the AND gate 51 is delayed for a predetermined time as defined by the RC time constant (i.e., R52*C53), thus delaying output of signal G2 from AND gate 51. The delay time is fixed to be sufficiently long to delay output signal G2 46 for a time sufficient to allow Chip_$V_{dd}$, to reach a threshold voltage level $V_{don}$. Once the RC time constant is exceeded, input B becomes and remains high and the output of AND gate 51 follows signal G2 at input A. Thus, circuit 9 prevents power switch M2 from being activated by signal G2 prior to the delay time to preclude the occurrence of a voltage transient as defined above. This is accomplished by causing the activation of power switch M2 32 to be sufficiently delayed (i.e., delaying output signal G2) for a time until at least signal Chip_$V_{dd}$ 43 which is sourced from voltage Inverter 100 input $V_{dd}$ 44, reaches a threshold level $V_{don}$ to prevent power switch from oscillating at an undesirable low frequency near the resonant frequency of the L-C series resonant circuit thereby causing undesirable startup voltage transients.

Figure 1:
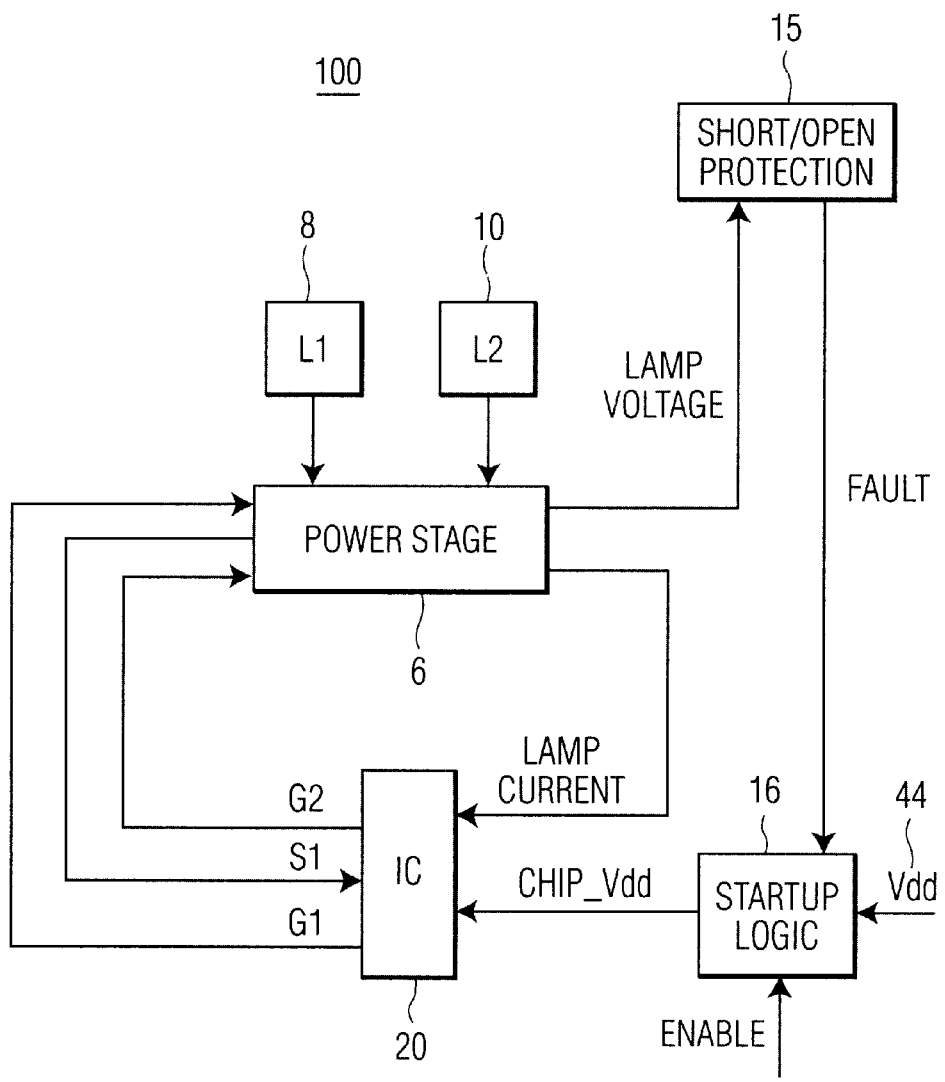
FIG. 1 is a block diagram of the LCD backlighting inverter according to the prior art.
Figure 2:
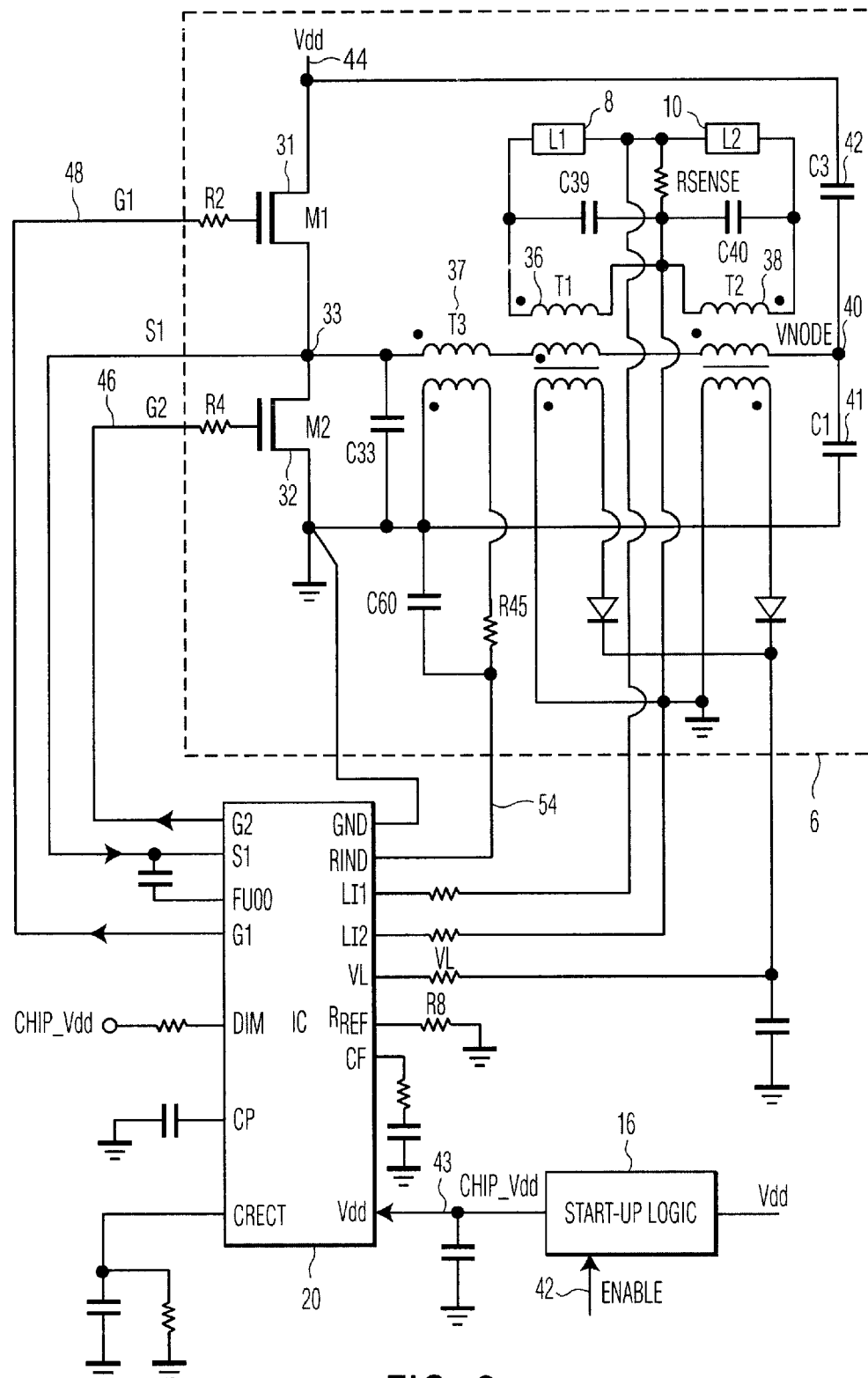
FIG. 2 is a more detailed circuit diagram of the LCD backlighting inverter of FIG. 1 including a detailed circuit diagram of the power stage module.
Figure 3:
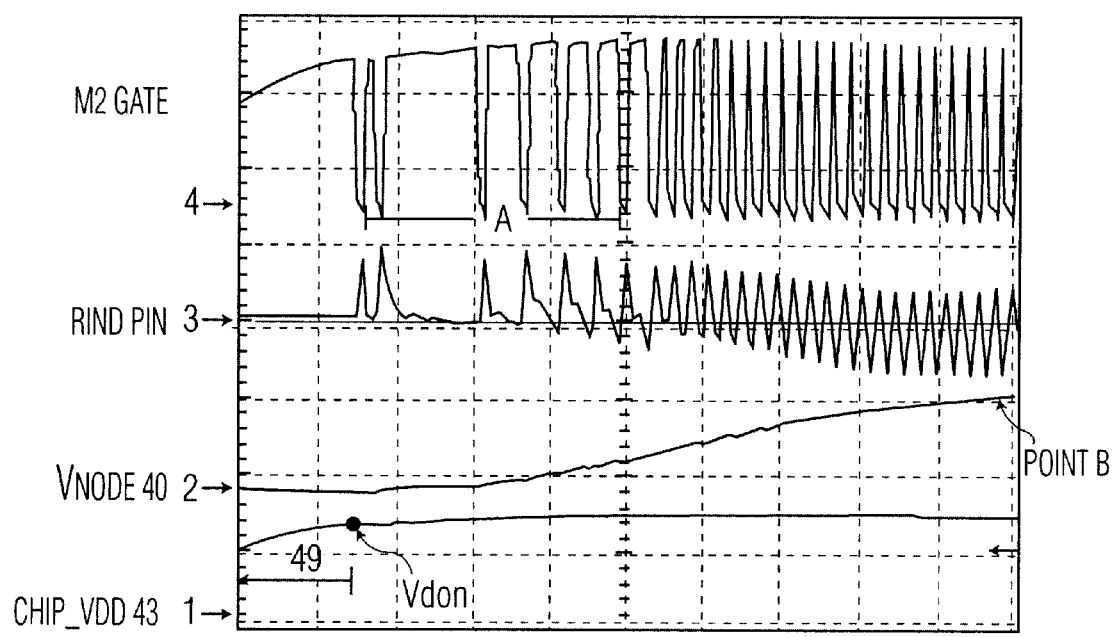
FIG. 3 is a waveform diagram illustrating how a voltage transient occurs in the prior art LCD backlighting inverter of FIG. 2.
Figure 5:
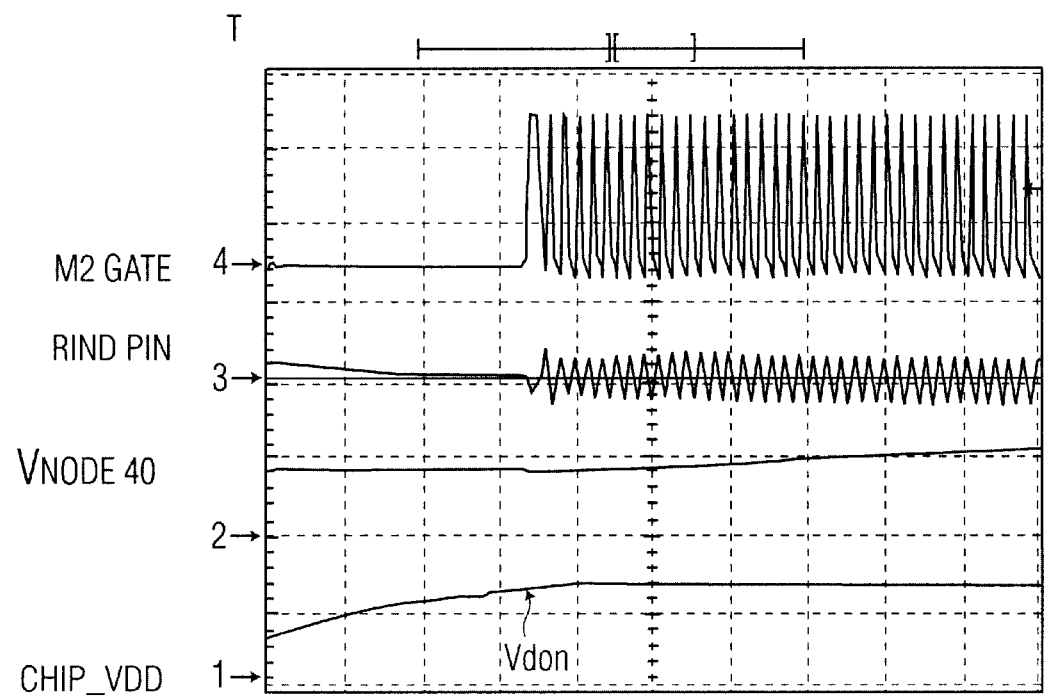
FIG. 5 is a waveform diagram illustrating how the voltage transient is eliminated in the embodiment of FIG. 4.

FIG. 5 is a waveform diagram illustrating the process described above for FIG. 4, wherein the horizontal axis is normalized for each channel. As shown, channel 1 represents signal Chip_$V_{dd}$ 43 which is sourced from voltage Inverter 100 input $V_{dd}$ 44 as in the prior art case. In contrast to the waveform depicted in FIG. 3, however, channel 2 of FIG. 5 shows that the signal VNODE 40 remains constant and a positive value while Chip_$V_{dd}$ increases to the value, $V_{don}$, due to the delay in signal G2 created by transient prevention circuit 9, thereby maintaining M2 in an off state. In general, the delay time of the RC time constant is somewhat arbitrary with the only mandated condition being that the delay is sufficiently long to allow the controller supply voltage to reach a threshold value. As in the prior art case, Chip_$V_{dd}$ 43 requires a finite amount of time to ramp up to a threshold level, however, in contrast to the prior art case, as illustrated by channels 2–4, an undesirable startup voltage transient does not occur as a consequence of VNODE (channel 2) not discharging to a zero value, as was true in the prior art case. As a consequence of VNODE 40 not discharging (because transient prevention circuit 9 maintains switching gate M2 inactive during this period), RIND sensing pin (channel 3) does not detect an inductor current asymmetry. Accordingly, switching gate M2 does not oscillate at a low frequency in response (channel 4). Rather, output gating signal G2 is maintained in an OFF state at least until Chip_$V_{dd}$ reaches a threshold voltage to allow switching gate M2 to operate at the proper switching frequency as shown.

2$^{nd}$ Embodiment

Figure 6:
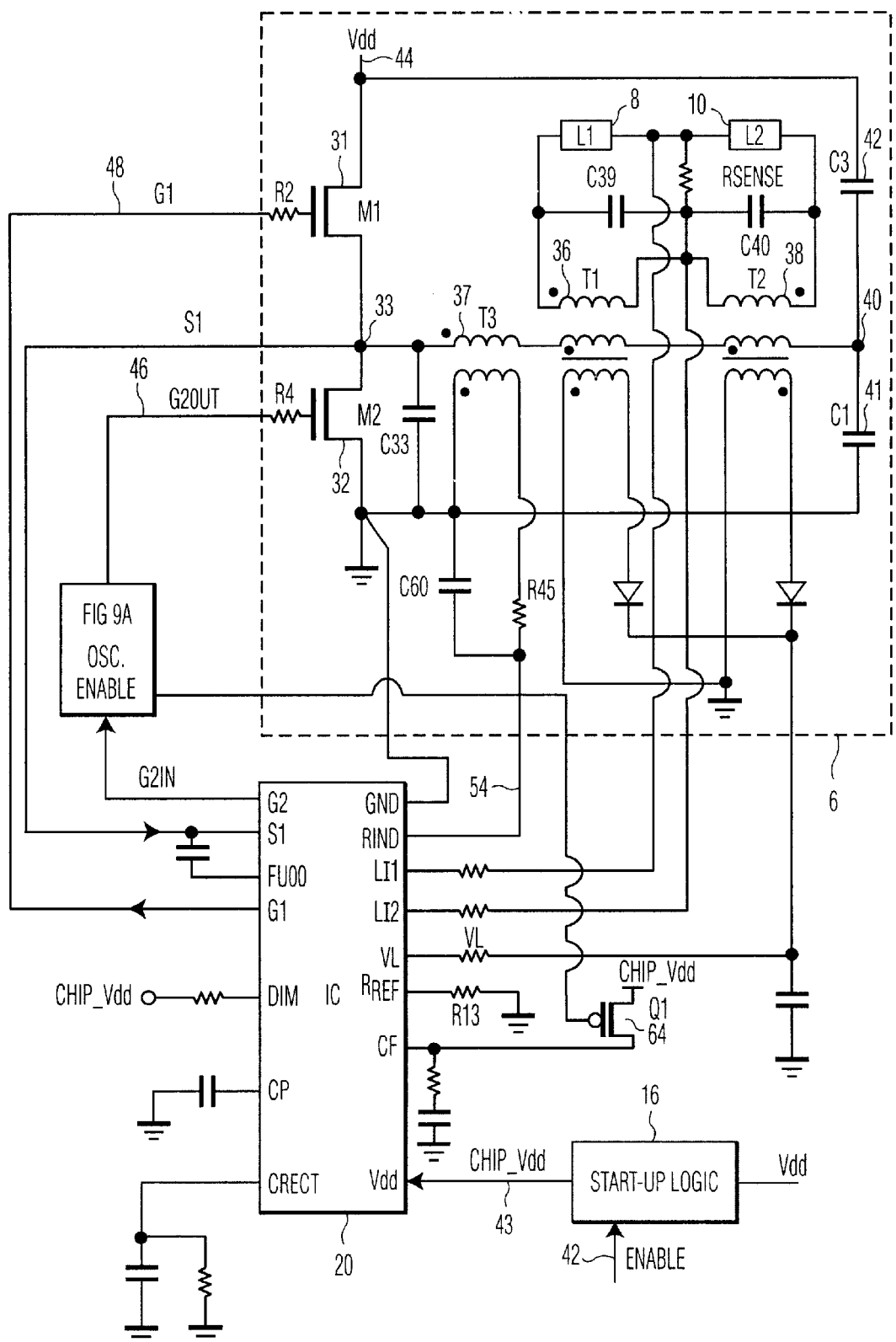
FIGS. 6 and 6A is an electronic circuit diagram of a an improved LCD backlighting inverter constructed in accordance with a second embodiment of the present invention.
Figure 6A:
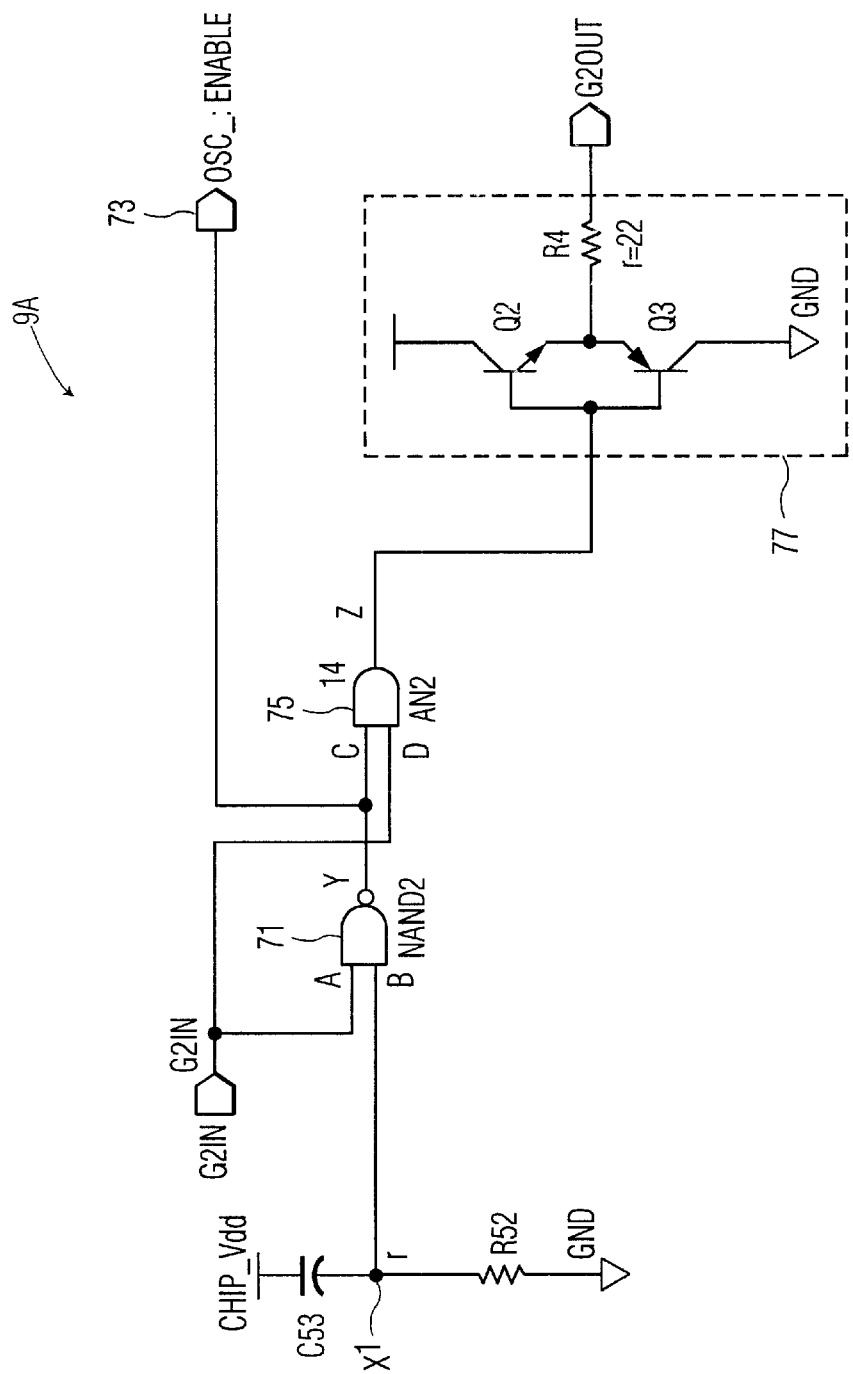

FIG. 6 is a detailed circuit diagram of a second embodiment that includes the transient prevention circuit of the present invention generally shown as reference numeral 9A, shown in greater detail in FIG. 6A. Circuit 9A comprises a two-input NAND gate 71 with one input connected to a midpoint X' of a series RC circuit having an associated RC time constant (i.e., R52*C53). It is noted that in an alternate embodiment the transient prevention circuit 9 of FIG. 6 may be included as part of a pulse width modulation (PWM) dimming logic module, in the case where a PWM dimming logic module is employed. Transient prevention as provided by circuit 9 is implemented by preventing IC 20 from performing internal oscillation during startup. In so doing, output pin G2 is prevented from being activated thereby preventing low side power switch M2 32 from transitioning to a conducting state prior to IC 20 input pin voltage reaching a threshold level $V_{don}$.

Referring to FIGS. 6 and 6A, in operation, output pin G2 of IC 20 (see FIG. 6) outputs a signal G2 which is provided as a first input to the NAND gate 71 of transient prevention circuit 9A. The second input of NAND gate 71 is sourced from a midpoint X' of the RC circuit comprising R52 and C53. For the RC circuit of FIG. 6A, the voltage at the midpoint X' decreases from Chip_$V_{dd}$ (a high value) to zero over the time constant RC. Thus, the output of the NAND gate 71 is opposite the G2in signal during startup. As previously noted, IC 20 maintains G2 high during startup, thus G2in is maintained high and the output of NAND gate 71 is low during start up.

Transient prevention circuit 9A provides two outputs, a first output signal Osc_Enable 73 along a line to an input of Q1 64 (see FIG. 6), which is a p-channel FET. In other embodiments, Q1 may be embodied as a bipolar PNP. It is well known that a low signal applied to the gate of a p-channel FET has the effect of maintaining the gate in an ON state. As seen in FIG. 6A, Osc_Enable 73 is provided by the output of NAND gate 71, "Y", and thus, as described above, is held low for a time defined by the RC time constant of the RC circuit, which maintains the gate of Q1 64 in an ON state. By maintaining Q1 64 in the ON state, input pin CF is effectively maintained at a high voltage via source Chip_$V_{dd}$, which prevents oscillation of signal output G2. This is done, for example, by maintaining a voltage on an oscillator capacitor, which is used to generate the oscillating signal such as G2.

Thus IC 20 is prevented from providing an internal oscillation at an undesirable frequency during startup, namely by preventing the oscillation of G2 for a time defined by the RC time constant (R52*C53). After the RC time constant has elapsed, the input B provided from point X' of the RC circuit goes low. When input B goes low, the output of NAND gate 71 is maintained high (irrespective of G2in at A), Osc_enable is consequently held high, Q1 64 is thus OFF and oscillation is thus permitted since CF is not maintained high.

It is noted that in addition to preventing internal oscillations from occurring in IC 20 for a duration defined by RC time constant R52*C53, switch M2 32 is also maintained in an OFF state for the same time period defined by the R52*C53 time constant. This is achieved as a consequence of the output (Z) of AND gate I4 75 being maintained a logic low. The logic low is maintained at the output of AND gate 14 75 due to the "C" input being sourced from NAND gate 71, whose respective output is maintained low during startup by virtue of the R52*C53 time constant. After start up, the output of NAND gate 71 is high as described above and the output of AND gate 75 thus follows the signal G2in input at the "D" input.

The output G2out of emitter-follower circuit 77 is effectively the same as the output Z of AND gate 75. Output Z of AND gate 75 is sourced to emitter-follower circuit 77, which effectively acts as a signal buffer for passing the signal "Z" 75 as a second output signal, G2out, of transient prevention circuit 9A. Thus, after startup, G2out follows G2in.

It will be understood that various modifications may be made to the embodiments disclosed herein, and that the above descriptions should not be construed as limiting, but merely as exemplifications of preferred embodiments. Those skilled in the art will envision other modifications within the scope and spirit of the claims appended hereto.

What is claimed is:

1. A switch mode converter for powering a load, comprising:
   a power stage that includes a first and a second power switch that operates at least one load during steady-state operation;
   a controller that receives a controller supply voltage, generates a plurality of control signals and provides a steady-state internal oscillation that drives said first and second power switches, and
   a transient prevention circuit that maintains said second power switch in a nonconducting state until at least a time at which said controller supply voltage reaches a threshold value.

2. The switch mode converter of claim 1, wherein said transient prevention circuit includes a resistor and a capacitor having an associated RC time constant that maintains said second power switch in a nonconducting state until at least a time at which said controller supply voltage reaches said threshold value.

3. The switch mode converter of claim 2, wherein said RC time delays one of the control signals being input to said power stage module for driving said power switches for until at least said time at which said controller supply voltage reaches said threshold value.

4. The switch mode converter of claim 1, wherein said first and second power switches comprise N-channel power MOSFETS coupled in a half bridge topology.

5. The switch mode converter of claim 1, wherein said switch mode converter is a liquid crystal display backlight inverter.

6. The switch mode converter of claim 1, wherein said load is a fluorescent lamp.

7. The switch mode converter of claim 6, wherein said fluorescent lamp is a cold cathode fluorescent lamp.

8. The switch mode converter of claim 7, wherein said cold cathode fluorescent lamp provides lighting for a liquid crystal display.

9. The switch mode converter of claim 1, wherein said transient prevention circuit is incorporated in a pulse width modulation circuit.

10. A switch mode converter for powering a load comprising:
    a power stage that includes a first and a second power switch that operates at least one load during steady-state operation;
    a controller that generates a plurality of control signals and having an internal oscillator that provides a steady-state internal oscillation that drives said first and second power switches, and
    a transient prevention circuit that prevents said oscillator from generating said internal oscillation until at least a time at which said said controller supply voltage reaches a threshold value.

11. The switch mode converter of claim 10, wherein said transient prevention circuit includes a resistor and a capacitor having an associated RC time constant for maintaining said second power switch in a nonconducting state until at least a time at which said controller supply voltage reaches said threshold value.

12. The switch mode converter of claim 10, wherein said transient prevention circuit includes a resistor and a capacitor having an associated RC time constant that maintains a signal input to said controller wherein said controller consequently maintains a voltage on an oscillator capacitor to thereby prevent oscillation of a control signal for at least one of said power switches.

13. The switch mode converter of claim 10, wherein said first and second power switches comprise N-channel power MOSFETS coupled in a half bridge topology.

14. The switch mode converter of claim 10, wherein said switch mode converter is a liquid crystal backlight inverter.

15. The switch mode converter of claim 10, wherein said load is a fluorescent lamp.

16. The switch mode converter of claim 15, wherein said fluorescent lamp is a cold cathode fluorescent lamp.

17. The switch mode converter of claim 16, wherein said cold cathode fluorescent lamp provides lighting for a liquid crystal display.

18. The switch mode converter of claim 10, wherein said transient prevention circuit is incorporated in a pulse width modulation circuit.

* * * * *